(12) United States Patent
Tsai et al.

(10) Patent No.: US 8,046,106 B2
(45) Date of Patent: Oct. 25, 2011

(54) CONTROLLING METHOD AND SYSTEM FOR SAVING ENERGY OF BUILDING

(75) Inventors: Kun-Cheng Tsai, Taipei (TW); Chung-Yu Wang, Tainan (TW); Jing-Tian Sung, Taipei (TW)

(73) Assignee: Institute for Information Industry, Taipei (TW)

( * ) Notice: Subject to any disclaimer, the term of this patent is extended or adjusted under 35 U.S.C. 154(b) by 408 days.

(21) Appl. No.: 12/336,519

(22) Filed: Dec. 16, 2008

(65) Prior Publication Data

US 2010/0131110 A1    May 27, 2010

(30) Foreign Application Priority Data

Nov. 26, 2008    (TW) .............................. 97145787 A

(51) Int. Cl.
- *G01M 1/38* (2006.01)
- *G05B 13/00* (2006.01)
- *G05B 15/00* (2006.01)
- *G05D 23/00* (2006.01)
- *F24D 19/10* (2006.01)
- *F24F 11/00* (2006.01)
- *G05D 23/275* (2006.01)

(52) U.S. Cl. ........ 700/275; 700/276; 700/277; 700/278; 236/1 B; 236/1 C; 236/44 C

(58) Field of Classification Search .................. 700/275, 700/276, 277, 278; 236/1 R, 1 B, 1 C, 44 C
See application file for complete search history.

(56) References Cited

U.S. PATENT DOCUMENTS

| | | | | |
|---|---|---|---|---|
| 4,351,588 A | * | 9/1982 | Zullig | 359/592 |
| 5,226,298 A | * | 7/1993 | Yamamoto et al. | 62/3.4 |
| 5,275,219 A | * | 1/1994 | Giacomel | 160/6 |
| 5,760,558 A | * | 6/1998 | Popat | 318/480 |
| 7,886,984 B2 | * | 2/2011 | Tsai et al. | 236/44 C |
| 2001/0027846 A1 | * | 10/2001 | Osinga | 160/70 |
| 2004/0059691 A1 | * | 3/2004 | Higgins | 705/412 |
| 2009/0027759 A1 | * | 1/2009 | Albahri | 359/277 |
| 2009/0159717 A1 | * | 6/2009 | Tsai et al. | 236/44 A |
| 2010/0001746 A1 | * | 1/2010 | Duchene et al. | 324/676 |
| 2010/0235206 A1 | * | 9/2010 | Miller et al. | 705/7 |
| 2010/0262293 A1 | * | 10/2010 | Byberg et al. | 700/275 |

\* cited by examiner

*Primary Examiner* — Ramesh Patel

(74) *Attorney, Agent, or Firm* — Jianq Chyun IP Office

(57) ABSTRACT

A controlling method and a controlling system for saving energy of a building are provided. In the present method, a user environment requirement is obtained first. Then, a plurality of cover ratios of a sunshade device on an opening of a building is defined, and according to an environment parameter and the user environment requirement, a total electricity consumption required by air conditioning equipment and by lighting equipment in the building corresponding to each of the cover ratios is calculated. Finally, a cover ratio that produces the minimum total electricity consumption is obtained, and the sunshade device, the air conditioning equipment and the lighting equipment are adjusted according to the obtained cover ratio, so as to make the building meet the user environment requirement and maintain a status of the minimum total energy consumption.

30 Claims, 5 Drawing Sheets

CONTROLLING METHOD AND SYSTEM FOR SAVING ENERGY OF BUILDING

CROSS-REFERENCE TO RELATED APPLICATION

This application claims the priority benefit of Taiwan application serial No. 97145787, filed on Nov. 26, 2008. The entirety of the above-mentioned patent application is hereby incorporated by reference herein and made a part of this specification.

BACKGROUND OF THE INVENTION

1. Field of the Invention

The present invention relates to a technology of gathering and integration of information, especially to a method and a system for integratingly applying the gathering of the information to saving energy of a building.

2. Description of Related Art

Judging whether a living environment is comfortable mostly depends on indicators such as temperature, moisture, speed of flow of air and light. However, under circumstances of global energy crisis, in addition to making residents feel comfortable, green buildings that are particular about saving energy are being paid more and more attention to. Generally, air conditioning equipment that controls the temperature and the moisture of the air consumes most energy in the building, and lighting equipment that maintains brightness indoors consume second most energy. A size of an opening of the building has most direct effects on energy consumption by two above methods.

The so-called opening is an area disposed on a wall or a ceiling for connection to outside. Currently in various sorts of smart building controlling methods developed for the green buildings, the better a shading effect, the more energy saved from the energy consumption by the air conditioning equipment. Hence, due to considerations of the energy consumption by the air conditioning equipment, building contractors mostly limit a size of the opening, so as to draw less radiation heat to achieve a purpose of saving from the energy consumption by the air conditioning equipment. Relatively, a smaller shading area draws more sunlight indoors, thereby greatly reducing the energy consumption by the lighting equipment.

Under circumstances of being unable to concurrently reduce the energy consumption by the air conditioning equipment and that by the lighting equipment, current designs of the opening of the building are mostly unilaterally designed towards drawing sunlight or insulating radiation heat and are not taking into consideration both the energy consumption by the air conditioning equipment and that by the lighting equipment. Such processing results lead to limited effects in saving energy and, moreover, cannot achieve a purpose of comprehensively saving energy.

SUMMARY OF THE INVENTION

In light of the above, the present invention provides a controlling method for saving energy of a building, which simultaneously takes in to consideration requirements for a heat environment and a light environment, so that a total electricity consumption of air conditioning equipment and lighting equipment of the building is maintained to a minimum.

The present invention provides a controlling system for saving energy of a building, which automatically adjusts a cover ratio of a sunshade device on an opening of the building according to a user environment requirement, so that the air conditioning equipment and the lighting equipment generate the minimum total electricity consumption to achieve best energy saving effects.

In order to achieve above and other purposes, the present invention provides a controlling method for saving energy of a building, which is used to control the building to follow the user environment requirement and maintain a status of minimum total electricity consumption. The building includes the opening, the sunshade device, the air conditioning equipment and the lighting equipment. The method first obtains the user environment requirement and defines a plurality of cover ratios of the sunshade device on the opening. Next, according to an environment parameter and the user environment requirement, a total electricity consumption required by the air conditioning equipment and by the lighting equipment in the building corresponding to each of the cover ratios is calculated. After obtaining the cover ratio for generating the minimum total electricity consumption, according to the obtained cover ratio, the sunshade device, the air conditioning equipment and the lighting equipment are adjusted so as to make the building maintain a status of the minimum total electricity consumption.

According to an embodiment of the present invention, the environment parameter includes at least efficiency of the air conditioning equipment, efficiency of the lighting equipment, heat obtaining conditions and outdoor sensed radiation heat corresponding to each of the cover ratios and outdoor illumination and indoor sensed heat corresponding to each of the cover ratios. The user environment requirement includes at least a temperature requirement and an illumination requirement.

According to an embodiment of the present invention, the step of calculating the total electricity consumption required by the air conditioning equipment and by the lighting equipment corresponding to each of the cover ratios includes obtaining one of the cover ratios. Next the heat obtaining condition corresponding to the obtained cover ratio is calculated, and according to the calculated heat obtaining condition, the outdoor sensed radiation heat, the indoor sensed heat, the temperature requirement and the efficiency of the air conditioning equipment, an electricity consumption of the air conditioning equipment is calculated.

According to an embodiment of the present invention, after the step of obtaining one of the cover ratios, calculating the outdoor sensed illumination corresponding to the obtained cover ratio and calculating an electricity consumption of the lighting equipment according to the calculated outdoor sensed illumination, the illumination requirement and the efficiency of the lighting equipment are further included.

According to an embodiment of the present invention, the step of calculating the total electricity consumption required by the air conditioning equipment and the lighting equipment corresponding to each of the cover ratios includes using the electricity consumption of the air conditioning equipment and the electricity consumption of the lighting equipment to calculate the total electricity consumption.

According to an embodiment of the present invention, the method further includes using a thermal radiometer parallelly disposed on an edge of the opening to sense the outdoor sensed radiation heat.

According to an embodiment of the present invention, the method further includes using an illuminometer parallelly disposed on an edge of the opening to sense the outdoor illumination.

According to an embodiment of the present invention, the method further includes using a temperature sensor disposed inside the building to sense the indoor sensed heat.

According to an embodiment of the present invention, the method further includes calculating the efficiency of the lighting equipment according to illumination information obtained by the illumination sensor disposed inside the building and a specification of the lighting equipment.

According to an embodiment of the present invention, the heat obtaining condition includes an area of the opening and a shading coefficient (SC) of a surface material of the opening. The surface material is, for example, glass.

According to an embodiment of the present invention, the step of adjusting the sunshade device according to the obtained cover ratio includes adjusting a shading area of the sunshade device covering the opening according to the cover ratio and the area of the opening.

According to an embodiment of the present invention, the step of adjusting the air conditioning equipment according to the obtained cover ratio includes adjusting at least one of a temperature parameter, a scenario setting parameter and a wind speed parameter or any combination of the above of the air conditioning equipment.

According to an embodiment of the present invention, the step of adjusting the lighting equipment according to the obtained cover ratio includes adjusting at least one of an actuation number and a brightness parameter or any combination of the above of the lighting equipment.

From another point of view, the present invention provides a controlling system for saving energy of the building. The system includes an input interface, a total electricity consumption calculation module and an equipment controlling module. The input interface is used for obtaining the user environment requirement of the building. The building includes the opening, the sunshade device, the air conditioning equipment and the lighting equipment. The total electricity consumption calculation module is connected to the input interface, is used to define the plurality of cover ratios of the sunshade device on the opening, and according to the environment parameter and the user environment requirement, calculates the total electricity consumption required by the air conditioning equipment and by the lighting equipment corresponding to each of the cover ratios, so as to obtain the cover ratio generating the minimum total electricity consumption. The equipment controlling module is connected to the total electricity consumption calculation module and is used to adjust the sunshade device, the air conditioning equipment and the lighting equipment according to the cover ratio obtained by the total electricity consumption calculation module, so that the building follows the user environment requirement and maintains the status of the minimum total electricity consumption.

According to an embodiment of the present invention, the environment parameter includes at least the efficiency of the air conditioning equipment, the efficiency of the lighting equipment, the heat obtaining conditions and the outdoor sensed radiation heat corresponding to each of the cover ratios and the outdoor illumination and the indoor sensed heat corresponding to each of the cover ratios The user environment requirement includes at least the temperature requirement and the illumination requirement.

According to an embodiment of the present invention, the total electricity consumption calculation module obtains one of the cover ratios, calculates the heat obtaining condition corresponding to the obtained cover ratio, and calculates the electricity consumption of the air conditioning equipment according to the calculated heat obtaining condition, the outdoor sensed radiation heat, the indoor sensed heat, the temperature requirement and the efficiency of the air conditioning equipment.

According to an embodiment of the present invention, the total electricity consumption calculation module calculates the outdoor sensed illumination corresponding to the obtained cover ratio and calculates the electricity consumption of the lighting equipment according to the calculated outdoor sensed illumination, the illumination requirement and the efficiency of the lighting equipment.

According to an embodiment of the present invention, the total electricity consumption calculation module uses the electricity consumption of the air conditioning equipment and the electricity consumption of the lighting equipment to calculate the total electricity consumption.

According to an embodiment of the present invention, the total electricity consumption calculation module receives the outdoor sensed radiation heat measured by the thermal radiometer through a wireless communication network. The thermal radiometer is parallelly disposed on the edge of the opening.

According to an embodiment of the present invention, the total electricity consumption calculation module receives the outdoor sensed illumination measured by the illuminometer through the wireless communication network. The illuminometer is, for example, parallely disposed on the edge of the opening.

According to an embodiment of the present invention, the total electricity consumption calculation module receives the indoor sensed heat measured by the temperature sensor through the wireless communication network. The temperature sensor is disposed inside the building.

According to an embodiment of the present invention, the total electricity consumption calculation module receives the illumination information obtained by the illuminometer through the wireless communication network and calculates the efficiency of the lighting equipment according to the illumination information and the specification of the lighting equipment. The illuminometer is disposed inside the building.

According to an embodiment of the present invention, the heat obtaining condition includes the area of the opening and the SC of the surface material of the opening. The surface material includes glass.

According to an embodiment of the present invention, the equipment controlling module adjusts the shading area of the sunshade device covering the opening according to the cover ratio and the area of the opening.

According to an embodiment of the present invention, the equipment controlling module adjusts at least one of the temperature parameter, the scenario setting parameter and the wind speed parameter or any combination of the above of the air conditioning equipment according to the minimum electricity consumption.

According to an embodiment of the present invention, the equipment controlling module adjusts at least one of the actuation number and the brightness parameter or any combination of the above of the lighting equipment according to the minimum electricity consumption.

Due to the above, after obtaining the user environment requirement of the building, the present invention also takes into consideration the electricity consumption of the air conditioning equipment and the lighting equipment, so as to adjust the cover ratio of the opening so that the building maintains the status of the minimum total electricity consumption. Therefore not only is comfort of the building maintained, the purpose of comprehensively saving energy is also achieved.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

As environmental protection concepts become important and an energy crisis occurs, saving energy of buildings is gradually being given weight to. How to avoid increasing energy consumption by lighting equipment too much while saving from energy consumption by air conditioning equipment is an important issue in technology of saving energy for the buildings. The present invention is a controlling method and system for saving energy of a building developed based on above views. In order to make the present invention more comprehensible, embodiments are described below as the examples to prove that the invention can actually be realized.

Figure 1:
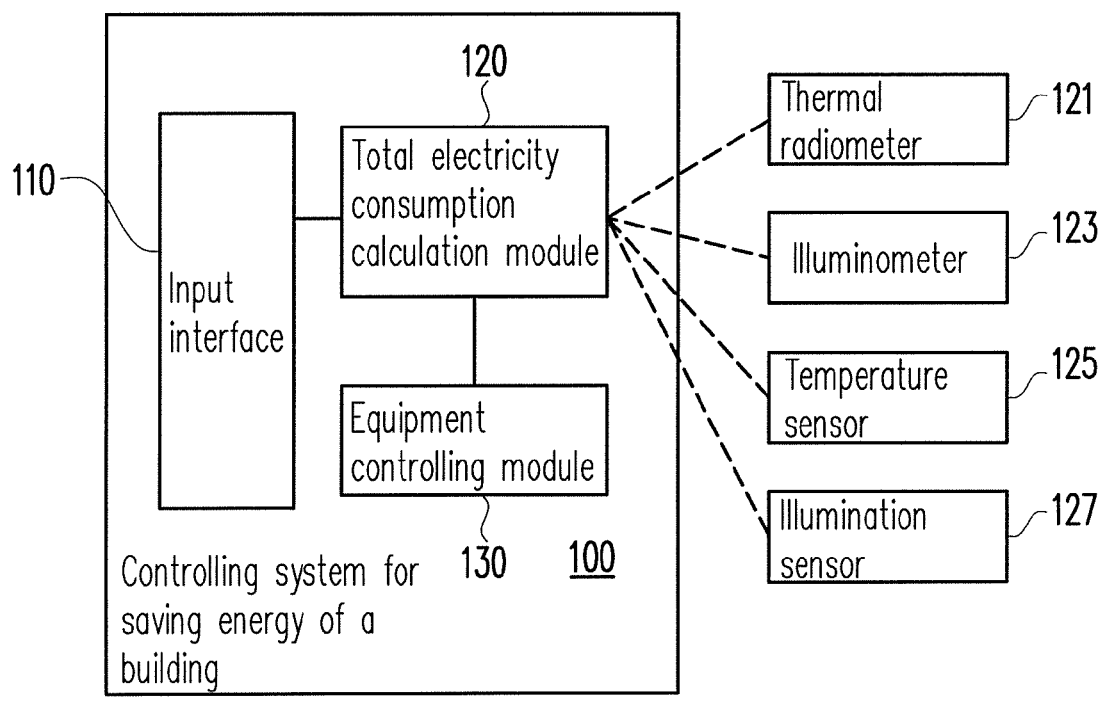
FIG. 1 is a block diagram showing a controlling system for saving energy of a building according to an embodiment of the present invention.

FIG. 1 is a block diagram showing a controlling system for saving energy of a building according to an embodiment of the present invention. Please refer to FIG. 1, a controlling system for saving energy of a building 100 is suitable for a building having an opening, a cooler or such air conditioning equipment and various sorts of lamps and lanterns or such lighting equipment. The building may have one or more than one opening, a sunshade device, a plurality of air conditioning equipment and lighting equipment. A number of the above does not limit the scope of the present invention. The controlling system for saving energy of the building 100 includes an input interface 110, a total electricity consumption calculation module 120 and an equipment controlling module 130. According to a user environment requirement of the building, a cover ratio of the opening and various parameters of the air conditioning equipment and the lighting equipment of the building are adjusted, so that the building maintains a status of minimum total electricity consumption.

In the controlling system for saving energy of the building 100, the input interface 110 is used to obtain the user environment requirement, for example a temperature requirement and an illumination requirement. For example, a user may desire for maintaining cooler temperatures in the building in spring and summer seasons. On the other hand, in autumn and winter seasons, the input interface 110 may be used to input a higher temperature requirement. The illumination requirement is related to activities performed by the user. For example, when the user is reading books, he or she may desire for maintaining a higher illumination in the building, such as above 800 lumens.

The total electricity consumption calculation module 120 is connected to the input interface 110, and can obtain information sensed by a thermal radiometer 121, an illuminometer 123, a temperature sensor 125 and an illumination sensor 127 through a wireless communication network such as Bluetooth or infrared, so that under the plurality of cover ratios, the total electricity consumption required by the air conditioning equipment and by the lighting equipment under the current environment parameter is calculated and which cover ratio generates a minimum total electricity consumption is determined.

The equipment controlling module 130 is connected to the total electricity consumption calculation module 120, is used to adjust the sunshade device on the opening according to a result obtained by the total electricity consumption calculation module 120, and simultaneously adjusts the air conditioning equipment and the lighting equipment, so that the building maintains the status of the minimum total electricity consumption on the premise of meeting the user environment requirement.

Figure 2:
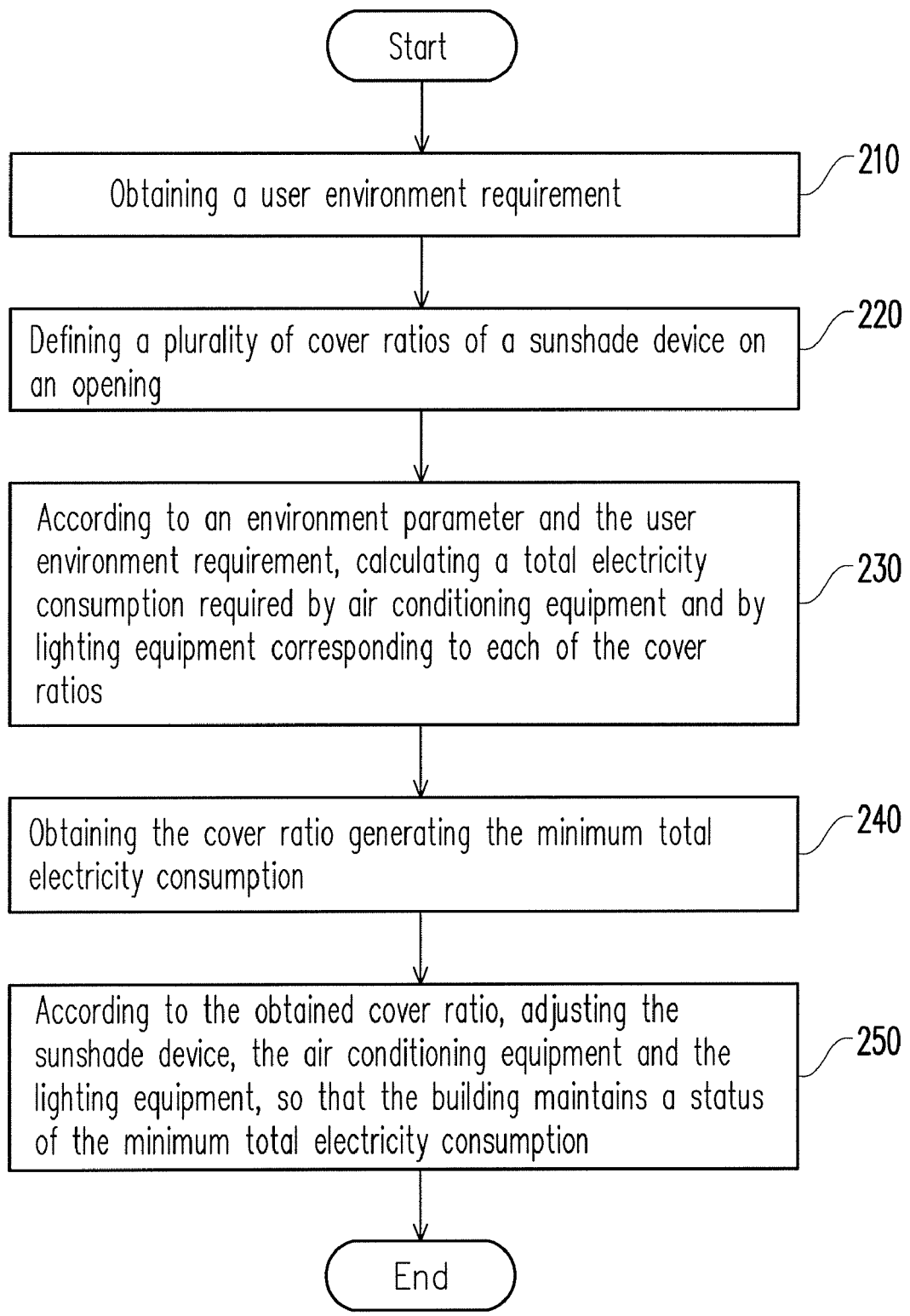
FIG. 2 is a flowchart diagram showing a controlling method for saving energy of a building according to an embodiment of the present invention.

In the following, the invention is further described using a detailed operating process of the controlling system for saving energy of the building 100. FIG. 2 is a flowchart diagram showing a controlling method for saving energy of a building according to an embodiment of the present invention. According to the following embodiment, the thermal radiometer 121 and the illuminometer 123 are, for example, parallelly disposed on an edge of the opening of the building, and the temperature sensor 125 and the illumination sensor 127 are disposed on representative positions inside the building, for example near an area in which the user is active. However, what must be described is that the present invention does not limit the above methods of disposing sensors, and the above sensors may also use the wireless communication network (or a wired network) to transmit the obtained information to the controlling system for saving energy of the building 100.

Please refer to both FIGS. 1 and 2. First in a step 210, the user environment requirement of the user to the building is obtained through the input interface 110. The user environment requirement includes at least a temperature requirement and an illumination requirement.

Next in a step 220, the plurality of cover ratios of the sunshade device on the opening is defined by the total electricity consumption calculation module 120. According to the present embodiment, presuming in a situation that the sunshade device is not activated (meaning that the sunshade device is totally open and does not shade the opening), the cover ratio is defined as 0% by the total electricity consumption calculation module 120, and when the sunshade device totally covers the opening, the cover ratio is defined as 100% by the total electricity consumption calculation module 120. The total electricity consumption calculation module 120 may further define the plurality of cover ratios between 0% and 100%, so as to correspond to various sorts of opening and closing statuses of the sunshade device.

Next, as shown in step 230, according to the current environment parameter of the building and the user environment requirement input by the user, the total electricity consumption calculation module 120 calculates the total electricity consumption required by the air conditioning equipment and by the lighting equipment of the building corresponding to each of the cover ratios. According to the present embodiment, the environment parameter includes at least the efficiency of the air conditioning equipment, the efficiency of the lighting equipment, the heat obtaining conditions and the outdoor sensed radiation heat corresponding to each of the cover ratios and the outdoor sensed illumination and the indoor sensed heat corresponding to each of the cover ratios In the following, steps of how the total electricity consumption calculation module 120 calculates the total electricity consumption are described in detail.

According to the present embodiment, the total electricity consumption calculation module 120 first obtains one of the cover ratios (in the following, the currently obtained cover ratio is named α, and α is a value between 0% and 100%). Next, the heat obtaining condition corresponding to the cover ratio α is calculated. Last, the electricity consumption of the air conditioning equipment is calculated according to the calculated heat obtaining condition, the outdoor sensed radiation heat, the indoor sensed heat, the temperature requirement and the efficiency of the air conditioning equipment. The heat obtaining condition includes an area of the opening and an SC of a surface material (for example glass) of the opening. The SC of the surface material increases or decreases with the different cover ratios. For example, the total electricity consumption calculation module 120 uses product of the area of the opening, the SC corresponding to the cover ratio a and the outdoor sensed radiation heat sensed by the thermal radiometer 121 as an obtained heat of the opening. What must be described is that a unit for the obtained heat of the opening is joule.

After calculating the obtained heat of the opening corresponding to the cover ratio a, the total electricity consumption calculating module 120 next adds the obtained heat of the opening and the indoor sensed heat sensed by the temperature sensor 125, so as to obtain a current heat indoors. Next, as the temperature requirement input by the user is subtracted from the sum of addition, a heat that must be additionally removed by the air conditioning equipment is thereby calculated. What must be mentioned is that the controlling system for saving energy of the building 100 uses the total electricity consumption as a basis for control of saving energy, so that the total electricity consumption calculation module 120 calculates the electricity consumption required by the air conditioning equipment to remove the additional heat in the current situation according to the efficiency of the air conditioning equipment. A unit for the electricity consumption of the air conditioning equipment is watt.

In addition to calculating the electricity consumption of the air conditioning equipment, the total electricity consumption calculation module 120 also calculates the electricity consumption required by the lighting equipment. For example, the illuminometer 123 disposed on the edge of the opening continuously collects the outdoor sensed illumination, but the actual outdoor sensed illumination drawn into the building (named in the following as a drawn illumination and has a unit of lumen) increase or decreases with the cover ratio α of the opening. Hence, the total electricity consumption calculation module 120 first calculates the outdoor sensed illumination corresponding to the cover ratio α, and then calculates the electricity consumption of the lighting equipment according to the calculated outdoor sensed illumination, the illumination requirement input by the user and the efficiency of the lighting equipment.

In detail, the total electricity consumption calculation module 120 uses the largest value of 0 and a difference between the illumination requirement and the drawn illumination as an illumination that the lighting equipment has to additionally make up for. In order to calculate the electricity consumption required by the lighting equipment to additionally make up for the illumination, the total electricity consumption calculation module 120 calculates the efficiency of the lighting equipment according to the illumination information obtained by the illumination sensor inside the building and a specification of the lighting equipment. Additionally, according to the efficiency of the lighting equipment, the electricity consumption (a unit thereof is watt) required by the lighting equipment to make up for the illumination in order to make lighting inside the building meet the illumination requirement of the user is calculated.

After respectively calculating the electricity consumption of the air conditioning equipment and the electricity consumption of the lighting equipment according to the current environment parameter and the user environment requirement under the cover ratio α, the total electricity consumption calculation module 120 uses the electricity consumption of the air conditioning equipment and the electricity consumption of the lighting equipment to calculated the total electricity consumption. According to an embodiment, the total electricity consumption calculation module 120 uses a sum of the electricity consumption of the air conditioning equipment and the electricity consumption of the lighting equipment as the total electricity consumption.

Figure 3A:
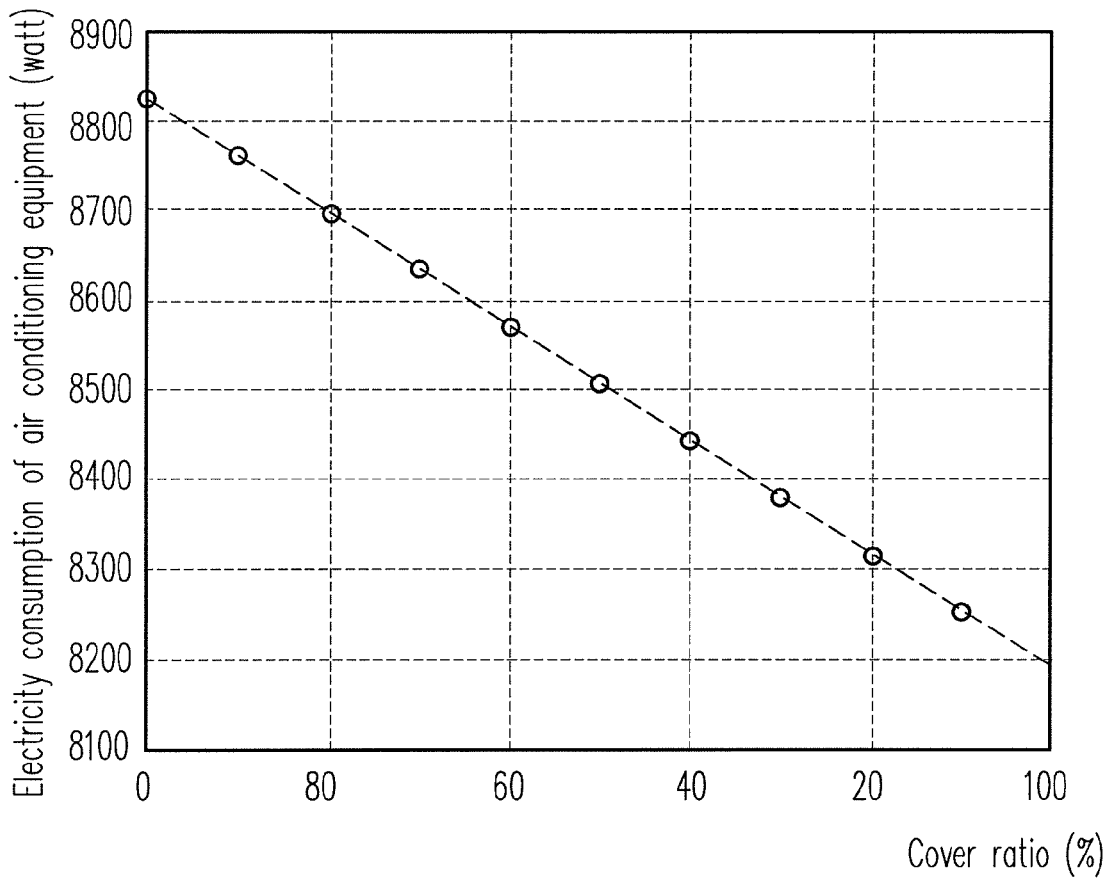
FIG. 3A is a relationship diagram showing electricity consumption of air conditioning equipment and cover ratios according to an embodiment of the present invention.
Figure 3B:
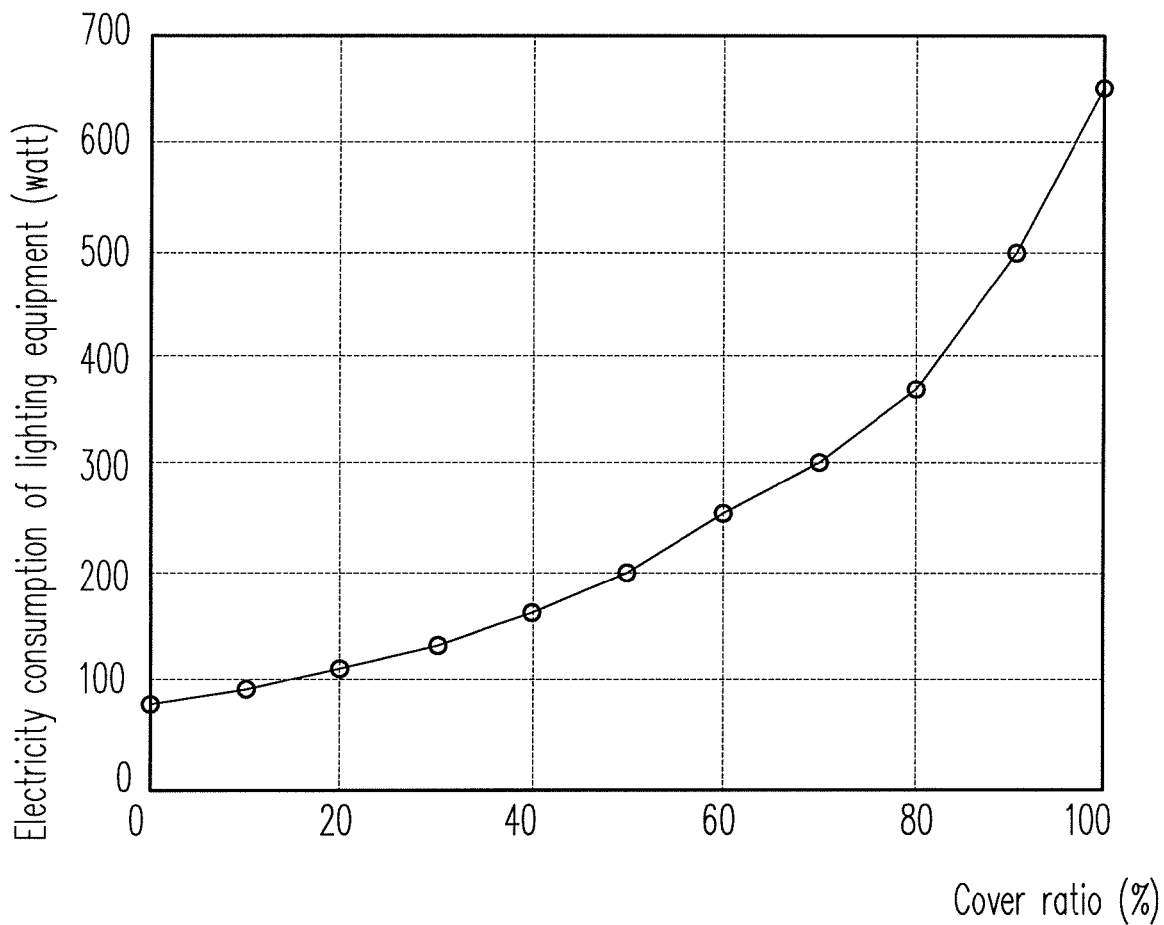
FIG. 3B is a relationship diagram showing electricity consumption of lighting equipment and cover ratios according to an embodiment of the present invention.
Figure 3C:
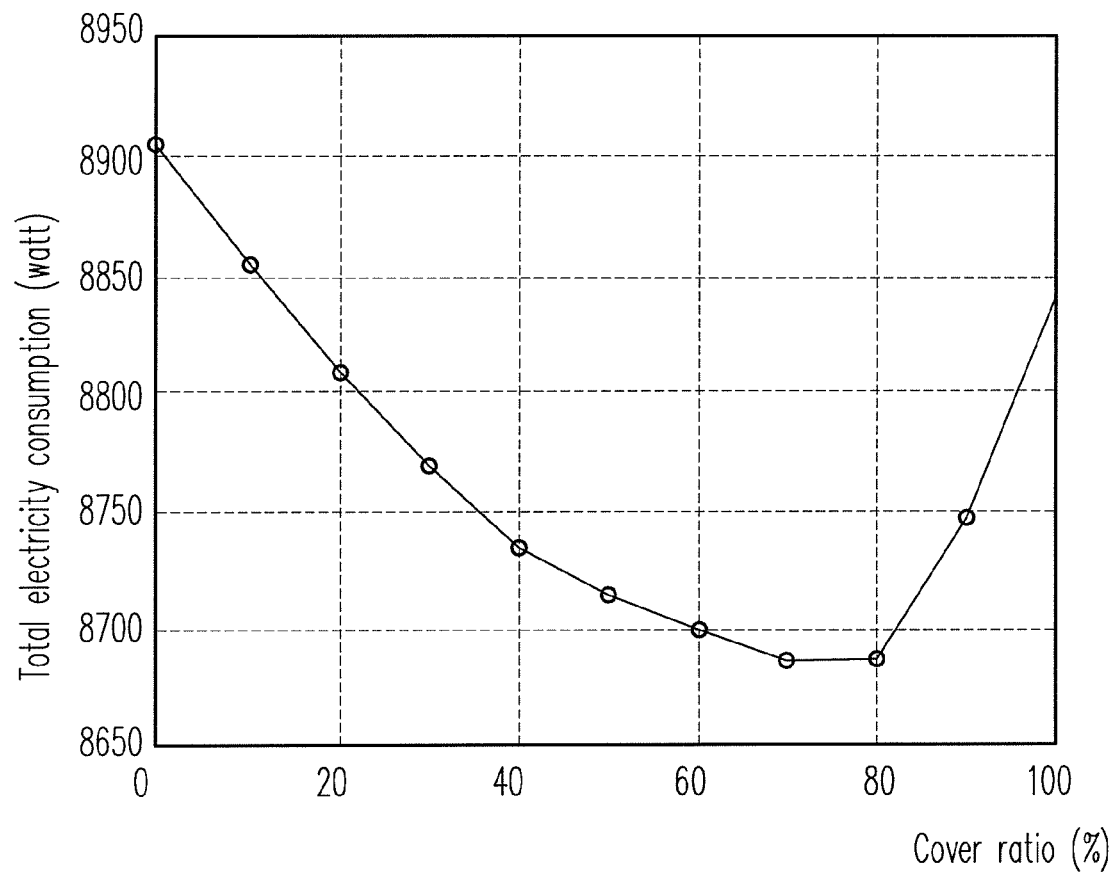
FIG. 3C is a relationship diagram showing total electricity consumption and cover ratios according to an embodiment of the present invention.

Through an above method, the total electricity consumption calculation module 120 calculates a corresponding relationship between each of the defined cover ratios and the total electricity consumption. Next in a step 240, the total electricity consumption calculation module 120 obtains the cover ratio generating the minimum electricity consumption. For example, FIGS. 3A and 3B are respectively relationship diagrams showing electricity consumption of air conditioning equipment and cover ratios. Please refer to FIG. 3A, when the cover ratio decreases from 100% to 80%, it means that the sunshade device on the opening changes from totally shading the opening to only shading 80% of the area of the opening. In such a situation, since the radiation heat that may be blocked relatively decreases, the electricity consumption of the air conditioning equipment increases about 100 watts. However, it can be known from FIG. 3B, when the cover ratio decreases from 100% to 80%, since the actual illumination drawn into the building increases, the electricity consumption of the lighting equipment relatively decreases about 250 watts. FIG. 3C is a relationship diagram, established by the total electricity consumption calculation module 120 according to information in FIGS. 3A and 3B, showing total electricity consumption and cover ratios By observing FIG. 3C, it can be discovered that when the cover ratio is 70%, the sum of the electricity consumption of the air conditioning equipment and the electricity consumption of the lighting equipment is minimum. This means that when the cover ratio is 70%, the building has a highest efficiency of saving energy.

Last, please refer back to step 250 in FIG. 2, the equipment controlling module 130 actually adjusts the sunshade device on the opening and the air conditioning equipment and the lighting equipment inside the building according to the cover ratio generating the minimum total electricity consumption obtained by the total electricity consumption calculation module 120, so that the building maintains the minimum total electricity consumption under the condition of meeting the user environment requirement.

For example, the equipment controlling module 130 adjusts a shading area of the sunshade device covering the opening according to the cover ratio and the area of the opening. Using an example wherein the area of the opening is 1 square meter, presuming that the total electricity consumption is minimum when the cover ratio is 70%, the equipment controlling module 130 adjusts the sunshade device to generate the shading area of 0.7 square meter.

In addition, the equipment controlling module 130 adjusts setting values such as the temperature parameter, the scenario setting parameter and wind speed parameter according to the minimum total electricity consumption through adjusting one of the parameters or simultaneously adjusting a plurality of parameters, so that the air conditioning equipment removes redundant heat under a status of saving most energy.

In addition, the equipment controlling module 130 similarly adjust the actuation number of the lighting equipment and the brightness parameter, so that under the premise that the indoor light in made up for, the electricity consumption of the air conditioning equipment and the electricity consumption of the lighting equipment being in compliance with the minimum total electricity consumption is ensured.

It can be discovered from the above that the controlling system for saving energy of the building 100 collects environment temperature and illumination sensed by various sorts of the sensors and uses an optimal algorithm to obtain the minimum total electricity consumption that meets the user environment requirement. Compared with situations wherein the user has to adjust the air conditioning equipment and the lighting equipment by himself or herself, the controlling system for saving energy of the building 100 only requires the user to input the user environment requirement to automatically control the building to obtain best energy saving effects, so as to make saving energy of the building more convenient.

In summary, the controlling method and system for saving energy of the building of the present invention effectively integrates information of energy consumption by heat and energy consumption by light, and obtains the minimum total electricity consumption of the air conditioning equipment and the lighting equipment according to the user environment requirement, so that it may be used as a basis for adjusting the cover ratio of the openings. Therefore, not only does the building meet the user environment requirement set by the user, the electricity consumption of the air conditioning equipment and of the lighting equipment are also taken into consideration, so that a purpose of comprehensively saving energy of the building is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A controlling method for saving energy of a building comprising an opening, an air conditioning equipment and a light equipment, the controlling method comprising:
    obtaining a user environment requirement;
    defining a plurality of cover ratios of a sunshade device on the opening;
    calculating a total electricity consumption required by the air conditioning equipment and by the lighting equipment under each of the cover ratios according to an environment parameter and the user environment requirement;
    obtaining one of the cover ratios corresponding to a minimum total electricity consumption; and
    automatically adjusting a shading area of the sunshade device covering the opening according to the obtained cover ratio, and automatically adjusting the air conditioning equipment and the lighting equipment respectively according to redundant heat and indoor light of the building corresponding to the obtained cover ratio.

2. The controlling method for saving energy of the building of claim 1, wherein the environment parameter comprises at least an efficiency of the air conditioning equipment, an efficiency of the lighting equipment, a heat obtaining condition corresponding to the cover ratios, an outdoor sensed radiation heat, an outdoor sensed illumination corresponding to the cover ratios and an indoor sensed heat.

3. The controlling method for saving energy of the building of claim 2, wherein the user environment requirement comprises at least a temperature requirement and an illumination requirement.

4. The controlling method for saving energy of the building of claim 3, wherein the step of calculating the total electricity consumption required by the air conditioning equipment and by the lighting equipment under each of the cover ratios comprises:
    obtaining one of the cover ratios;
    calculating the heat obtaining condition corresponding to the obtained cover ratio; and
    according to the calculated heat obtaining condition, the outdoor sensed radiation heat, the indoor sensed heat, the temperature requirement and the efficiency of the air conditioning equipment, calculating an electricity consumption of the air conditioning equipment.

5. The controlling method for saving energy of the building of claim 4, after the step of obtaining one of the cover ratios, further comprising:
    calculating the outdoor sensed illumination corresponding to the obtained cover ratio; and
    according to the calculated outdoor sensed illumination, the illumination requirement and the efficiency of the lighting equipment, calculating an electricity consumption of the lighting equipment.

6. The controlling method for saving energy of the building of claim 5, wherein the step of calculating the total electricity consumption required by the air conditioning equipment and by the lighting equipment under each of the cover ratios comprises:
    using the electricity consumption of the air conditioning equipment and the electricity consumption of the lighting equipment to calculate the total electricity consumption.

7. The controlling method for saving energy of the building of claim 2, further comprising:
    using a thermal radiometer disposed parallelly on an edge of the opening to sense the outdoor sensed radiation heat.

8. The controlling method for saving energy of the building of claim 2, further comprising:
    using an illuminometer disposed parallelly on an edge of the opening to sense the outdoor sensed illumination.

9. The controlling method for saving energy of the building of claim 2, further comprising:
    using a temperature sensor disposed inside the building to sense the indoor sensed heat.

10. The controlling method for saving energy of the building of claim 2, further comprising:
    according to an illumination information obtained by an illumination sensor disposed inside the building and a specification of the lighting equipment, calculating the efficiency of the lighting equipment.

11. The controlling method for saving energy of the building of claim 2, wherein the heat obtaining condition comprises an area of the opening and a shading coefficient of a surface material on the opening.

12. The controlling method for saving energy of the building of claim 11, wherein the surface material comprises glass.

13. The controlling method for saving energy of the building of claim 1, wherein the step of automatically adjusting the shading area of the sunshade device covering the opening according to the obtained cover ratio comprises:
adjusting the shading area of the sunshade device covering the opening according to the cover ratio and an area of the opening.

14. The controlling method for saving energy of the building of claim 1, wherein the step of adjusting the air conditioning equipment according to redundant heat corresponding to the obtained cover ratio comprises:
according to the minimum total electricity consumption, adjusting at least one of a temperature parameter, a scenario setting parameter and a wind speed parameter or any combination of above of the air conditioning equipment.

15. The controlling method for saving energy of the building of claim 1, wherein the step of adjusting the lighting equipment according to indoor light of the building corresponding to the obtained cover ratio comprises:
according to the minimum total electricity consumption, adjusting at least one of an actuation number and a brightness parameter or any combination of above of the lighting equipment.

16. A controlling system for saving energy of a building, comprising:
an input interface, used for obtaining a user environment requirement of the building, wherein the building comprises an opening, a sunshade device, an air conditioning equipment and a lighting equipment;
a total electricity consumption calculation module, coupled to the input interface, used for defining a plurality of cover ratios of the sunshade device on the opening, calculating a total electricity consumption required by the air conditioning equipment and by the lighting equipment under each of the cover ratios according to an environment parameter and the user environment requirement, and obtaining one of the cover ratios corresponding to a minimum total electricity consumption; and
an equipment controlling module, coupled to the total electricity consumption calculation module and used for automatically adjusting a shading area of the sunshade device covering the opening according to the cover ratio obtained by the total electricity consumption calculation module, and automatically adjusting the air conditioning equipment and the lighting equipment respectively according to redundant heat and indoor light of the building corresponding to the cover ratio obtained by the total electricity consumption calculation module.

17. The controlling system for saving energy of the building of claim 16, wherein the environment parameter comprises at least an efficiency of the air conditioning equipment, an efficiency of the lighting equipment, a heat obtaining condition corresponding to the cover ratios, an outdoor sensed radiation heat, an outdoor sensed illumination corresponding to the cover ratios and an indoor sensed heat.

18. The controlling system for saving energy of the building of claim 17, wherein the user environment requirement comprises at least a temperature requirement and an illumination requirement.

19. The controlling system for saving energy of the building of claim 18, wherein the total electricity consumption calculation module obtains one of the cover ratios, calculates the heat obtaining condition corresponding to the obtained cover ratio, and according to the calculated heat obtaining condition, the outdoor sensed radiation heat, the indoor sensed heat, the temperature requirement and the efficiency of the air conditioning equipment, calculates an electricity consumption of the air conditioning equipment.

20. The controlling system for saving energy of the building of claim 19, wherein the total electricity consumption calculation module calculates the outdoor sensed illumination corresponding to the obtained cover ratio, and according to the calculated outdoor sensed illumination, the illumination requirement and the efficiency of the lighting equipment, calculates an electricity consumption of the lighting equipment.

21. The controlling system for saving energy of the building of claim 20, wherein the total electricity consumption calculation module uses the electricity consumption of the air conditioning equipment and the electricity consumption of the lighting equipment to calculate the total electricity consumption.

22. The controlling system for saving energy of the building of claim 17, wherein the total electricity consumption calculation module receives the outdoor sensed radiation heat sensed by a thermal radiometer parallelly disposed on an edge of the opening through a wireless communication network.

23. The controlling system for saving energy of the building of claim 17, wherein the total electricity consumption calculation module receives the outdoor sensed illumination sensed by an illuminometer parallelly disposed on an edge of the opening through a wireless communication network.

24. The controlling system for saving energy of the building of claim 17, wherein the total electricity consumption calculation module receives the indoor sensed heat sensed by a temperature sensor disposed inside the building through a wireless communication network.

25. The controlling system for saving energy of the building of claim 17, wherein the total electricity consumption calculation module receives an illumination information obtained by an illumination sensor disposed inside the building through a wireless communication network, and according to the illumination information and a specification of the lighting equipment, calculates the efficiency of the lighting equipment.

26. The controlling system for saving energy of the building of claim 17, wherein the heat obtaining condition comprises an area of the opening and a shading coefficient of a surface material on the opening.

27. The controlling system for saving energy of the building of claim 26, wherein the surface material comprises glass.

28. The controlling system for saving energy of the building of claim 16, wherein the equipment controlling module adjusts the shading area of the sunshade device covering the opening according to the cover ratio and an area of the opening.

29. The controlling system for saving energy of the building of claim 16, wherein according to the minimum total electricity consumption, the equipment controlling module adjusts at least one of a temperature parameter, a scenario setting parameter and a wind speed parameter or any combination of above of the air conditioning equipment.

30. The controlling system for saving energy of the building of claim 16, wherein according to the minimum total electricity consumption, the equipment controlling module adjusts at least one of an actuation number and a brightness parameter or any combination of above of the lighting equipment.

* * * * *